(12) United States Patent
Hargroder (10) Patent No.: US 7,011,321 B2
(45) Date of Patent: Mar. 14, 2006

(54) QUICK RELEASE DETACHABLE WHEELS

(76) Inventor: Todd L. Hargroder, 401 Isom Rd., #520, San Antonio, TX (US) 78216

( * ) Notice: Subject to any disclaimer, the term of this patent is extended or adjusted under 35 U.S.C. 154(b) by 0 days.

(21) Appl. No.: 10/622,339

(22) Filed: Jul. 18, 2003

(65) Prior Publication Data
US 2004/0017058 A1    Jan. 29, 2004

Related U.S. Application Data

(62) Division of application No. 10/154,356, filed on May 23, 2002, now Pat. No. 6,634,665.

(51) Int. Cl.
B60B 35/00    (2006.01)
(52) U.S. Cl. .............................. 280/250.1; 301/111.03
(58) Field of Classification Search ........... 301/111.01, 301/111.03, 111.04, 121, 124.2; 280/304.1, 280/250.1
See application file for complete search history.

(56) References Cited

U.S. PATENT DOCUMENTS

| | | | | |
|---|---|---|---|---|
| 4,392,690 A | * | 7/1983 | Anderson | ................... 301/121 |
| 4,664,252 A | * | 5/1987 | Galbraith | .................... 198/722 |
| 4,679,862 A | * | 7/1987 | Luo | ........................... 301/112 |
| 4,906,053 A | * | 3/1990 | Kawai | ..................... 301/110.5 |
| 6,193,325 B1 | * | 2/2001 | Lin | ....................... 301/111.03 |
| 6,435,622 B1 | * | 8/2002 | Kanehisa et al. | ......... 301/110.5 |
| 6,454,363 B1 | * | 9/2002 | Vignocchi et al. | ........ 301/124.2 |
| 6,499,810 B1 | * | 12/2002 | Krahl | ...................... 301/124.2 |
| 6,561,593 B1 | * | 5/2003 | Godwin | ................. 301/111.04 |
| 6,634,665 B1 | * | 10/2003 | Hargroder | ................ 280/304.1 |
| 6,682,152 B1 | * | 1/2004 | Melgarejo et al. | ...... 301/111.06 |

* cited by examiner

Primary Examiner—Tony Winner (57) ABSTRACT

A quick release detachable wheel hub assembly is shown for a lightweight manual wheelchair. The wheelchair wheels mount on exterior hubs and rotate therewith. The inner face out of each of the exterior hubs mates with an opposing outer face of interior hubs. One of the opposing faces on the hubs has a projection or a plurality of projections which fit snugly into corresponding openings on the opposing face of the other hub when the opposing faces of the hubs are mated. The interior hubs are mounted and rotate on detachable axles which screw into the wheelchair frame. A quick release, removable locking pin is inserted through the center of the hubs and into detachable axle and locked in place and thereby causing the hubs to be locked and rotate together. The wheels are quickly detached by simply removing the locking pins and pulling apart the hubs.

10 Claims, 10 Drawing Sheets

QUICK RELEASE DETACHABLE WHEELS

This is a divisional patent application based on U.S. Continuation patent application Ser. No. 10/154,356 filed on May 23, 2002, now a U.S. Pat. No. 6,634,665 B2 issued Oct. 21, 2003.

BACKGROUND OF THE INVENTION

1. Field of the Invention

The present invention relates generally to the field of wheelchairs and, more specifically, to an electrical braking system and quick release, detachable wheels for manual wheelchairs.

2. Description of the Related Prior Arts

Numerous types of braking mechanisms for manual wheelchairs are known in the art. The most typical manual wheelchair brake is a manual "over center" locking device which is activated by a lever arm and, when forced into its locking position, presses a braking member against the surface of the wheelchair tire creating a frictional braking action. Several factors mitigate against the usefulness and reliability of these types of brakes. Loss of tire pressure reduces the frictional force exerted by the crossbar on the tire and hence reduces the braking effect. A significant air pressure loss leaves these brakes useless. During transfer in and out of the chair, this type of brake allows the tire to slide underneath the crossbar and the wheelchair to move. Similarly, the brakes are ineffective and will not adequately hold the wheelchair on an incline. Other types of manual brakes include caliper type brakes manually activated with a lever arm mounted to a cable and brake assembly causing brake pads to press against the rim of the wheelchair wheel.

In these types of brakes, the frictional braking force exerted is directly related to the manual force which must be exerted on the lever arm by the brake operator to activate the brake. Wheelchair users who have arm or hand limitations may not be physically able to operate these brakes. These braking mechanisms only apply a braking force to one wheel. If an equal braking force is desired on both wheels, the user is required to use both arms and attempt to apply an equal force to both lever arms at the same time. This is difficult, if not impossible. Wheelchair frame and wheel design most often require the placement of the lever arms on the frame of the wheelchair near the user's knees. The placement of these lever arms interferes with the user's transfer in and out of the wheelchair. These lever arms require lifting the user's body in order to clear the lever during transfer.

A patent to Ross and Gunther, U.S. Pat. No. 5,358,266 describes a plate attached to a braking member, which applies a braking frictional force to the wheelchair tire when electronically activated by a solenoid rod. The solenoid rod is activated by means of a switch attached to the seat of the wheelchair. When the wheelchair user is raised out of the seat, the switch is activated and operates the braking mechanism. Also disclosed in this patent is a manually activated lever arm to operate the same braking member when the wheelchair user is seated. The same deficiencies discussed above apply to this wheelchair while the wheelchair user is seated. A wheelchair user with arm or hand limitations may not be able to operate the hand lever and the lever arm braking mechanism to apply a braking force to one wheel. In addition, the position of the lever arm may interfere with transfer in and out of the wheelchair.

Electric wheelchairs with various forms of braking means are common in the prior art. These braking means include gear reduction mechanisms, electromagnetic braking by means of a resistance applied to the electric motors, electronically activated frictional braking mechanisms where a solenoid is electrically energized to move brake shoes into frictional contact with a brake drum, and conventional manual brakes operated by a lever mechanism. These electric wheelchairs are heavy, cumbersome, difficult to transport, and do not promote physical activity by the user.

Wheelchair users have reason to frequently remove the wheels from their wheelchairs. It is often done for storage purposes, for brake adjustment, for wheel repair, and for wheel exchange. For example, in order to store a wheelchair in a vehicle, it is often desirable to remove the wheels.

Heretofore, the wheels on manual wheelchairs and other types of wheelchairs have been attached to the wheelchair frame by some type of hub with the wheels secured to the hub with nuts and bolts. In order to remove the wheels from the wheelchair, it has been necessary to unscrew and remove each of the nuts and bolts securing the wheel to the hub. This is a time consuming and cumbersome process. Once again, wheelchair users who have arm or hand limitations may not be physically able to remove the nuts and bolts.

More recently, it has become common in the art to attach wheels to manual wheelchairs using quick release locking pins which hold the wheel to the axle. In this type of design, it is difficult to also have a braking means on the wheelchair wheel other than the manual "over center" locking device which presses a braking member against the surface of the tire as described herein. Heretofore, other brakes have been ineffective on wheelchairs with quick release locking pins because the braking means had to be released and moved or disassembled in order to remove the wheel and thereby defeating the purpose of the quick release locking pin.

It is desirable to have a lightweight, manual wheelchair with an effective easily operatable electronic braking mechanism and, at the same time, quick release detachable wheels.

SUMMARY OF THE INVENTION

It is an object of this invention to provide an electronically activated braking system for a lightweight, manual wheelchair, which allows the wheelchair to maintain its lightweight and maneuverability characteristics.

It is a further object of this invention to have an electronically activated braking system for manual wheelchairs which eliminates the need for users of the wheelchair to manually operate brakes by means of a lever mechanism.

It is a further object of this invention to provide a braking system for manual wheelchairs, which provides equal braking force to both wheels of a wheelchair simultaneously.

It is a further object of this invention to provide a braking means for a manual wheelchair, which can be activated without the use of a manually operated lever that interferes with transfer in and out of the wheelchair by the user.

It is a further object of this invention to provide a braking means for manual wheelchairs, which eliminates movement of the wheelchairs on inclines and during transfer in and out of the wheelchair by the user.

It is a further object of this invention to provide a braking means for manual wheelchairs, which allows for detaching the wheelchair wheels without disturbing the braking means.

It is a further object of this invention to provide for quick release, easily detachable wheels.

It is a further object of this invention to provide for detachable wheels, which eliminates the need for users of the wheelchair to unscrew numerous nut and bolt combinations in order to remove the wheel.

It is a further object of this invention to provide for quick release, easily detachable wheels which allow the wheels to be removed without removing the disk and brake assembly.

In order to achieve these objectives, this invention provides for an electronic braking system, which is comprised of a braking means, a cable pulley system for activating the braking means, a DC liner actuator with actuator rod connected to the cable pulley system, a motion limit switch, a rechargeable twelve-volt battery electronically connected to the DC actuator, and a double throw control switch electronically connected to the battery for activating the battery power.

It is anticipated that the preferred braking means is a caliper-type brake positioned to clamp onto a metal disk mounted axially to a hub which rotates on the axle of each wheelchair wheel. The hub on which the disk is mounted interlocks with the hub on which the wheelchair wheel is mounted. The interlocking hubs are locked together with a locking pin, which extends axially through the center of the mated hubs such that the hubs are locked and rotate together when the wheelchair wheel is turned.

The locking pin is equipped with retractable nipples which, when extended, hold the locking pin securely in place. The retractable nipples are spring biased in the extended position and are activated by a push button at one end of the locking pin which releases the spring and allows the nipples to retract. When the nipples are in the retracted position, the locking pin can be removed simply by sliding it out of the axle. This allows the wheelchair wheel to be removed since there is no longer anything holding the mated hubs together.

The braking means for each wheel are connected to opposite ends of a cable wire. The cable wire passes around a pulley such that displacement of the pulley provides equal force and displacement to said opposite ends of the cable wire. The ends of the cable wire are directed through small openings in a mounting bracket. The openings are spaced a distance equal to the diameter of the pulley so the cable wire remains parallel as it extends from the pulley through said openings. A circular pulley cap is placed concentrically over the pulley. The vertical side of the pulley cap has two openings to allow for the passage of the wire cable into the pulley cap through the first opening, around the pulley and out the second opening. The pulley cap, pulley, and cable wire assembly is then connected to the outer end of the actuator rod by a coupling bracket.

The DC linear actuator is mounted on the wheelchair in a manner to allow the actuator rod to extend and displace the pulley and cable wire in line with the actuator rod's axis. The DC linear actuator is electronically powered by a twelve-volt rechargeable battery mounted to the wheelchair. The battery power is activated by a double throw control switch mounted to the wheelchair in a position where it is easily accessed by both the wheelchair user and a person assisting the wheelchair user.

The double throw toggle switch can be thrown in two different directions. When the double throw toggle switch is thrown in the first direction, it will cause the actuator rod to retract, pulling the pulley and cable wires and activating the braking force. When the toggle switch is thrown in the second direction, it will cause the actuator rod to extend, pushing the pulley and cable wire and deactivating the braking force.

In order to limit the tension in the cable wire, a motion limit switch can be added to the electrical brake system. The motion limit switch is wired into the circuit between the double throw toggle switch and said DC linear actuator. The motion limit switch is activated by displacement of the actuator rod in the direction which pulls the cable wire and activates the braking means. Once a selected braking force is attained, the motion limit switch opens the circuit and stops the displacement of the actuator rod.

DETAILED DESCRIPTION OF THE PREFERRED EMBODIMENT

Figure 1:
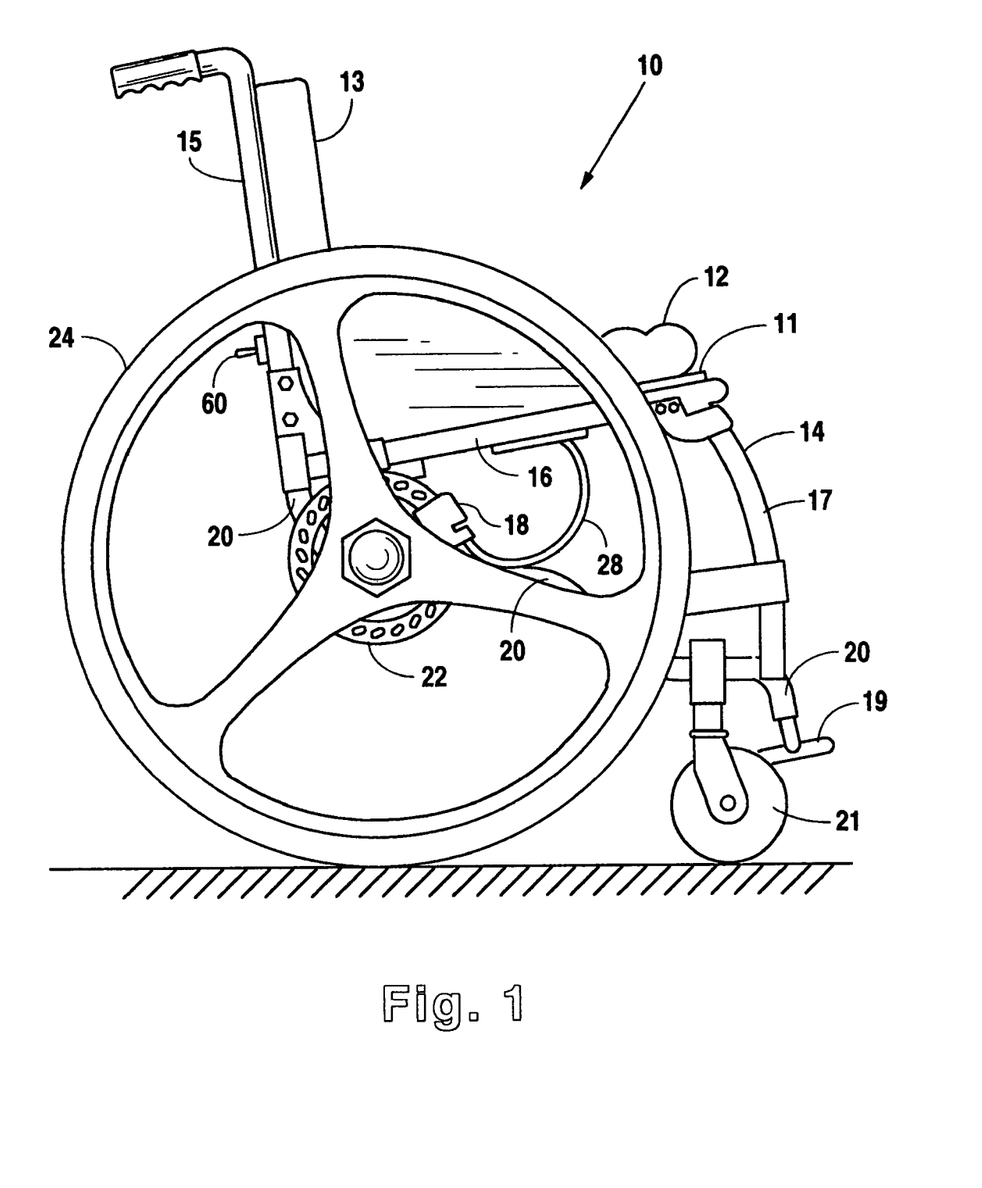
FIG. 1 is a elevational side view of a manual wheelchair depicting a caliper braking mechanism mounted to the wheelchair frame and positioned to clamp onto a metal disk mounted axially to the hub of the wheelchair wheel.

Referring to FIG. 1, a lightweight manual wheelchair 10 is equipped with a solid seat base 11, seat cushion 12, and seat back 13 mounted between first and second wheelchair wheels 24 generally to a frame 14. The frame 14 has a vertical component 15, a side horizontal component 16, a frontal curved component 17 and a lower curved component 20. A footrest 19 is mounted at the frontal extremity of the lower curved component 20 of the frame 14. First and second caster wheels 21 are pivotally mounted toward the frontal extremity of the lower curved component 20 of the frame 14. The manual wheelchair 10 is symmetrical about a centre line and the opposed side is identical to the side visible in FIG. 1. Thus, when the first and second of numbered items are referred to without the second item being shown, it can be appreciated that the second numbered item is identical to the first but on the opposite side of the wheelchair.

Figure 4:
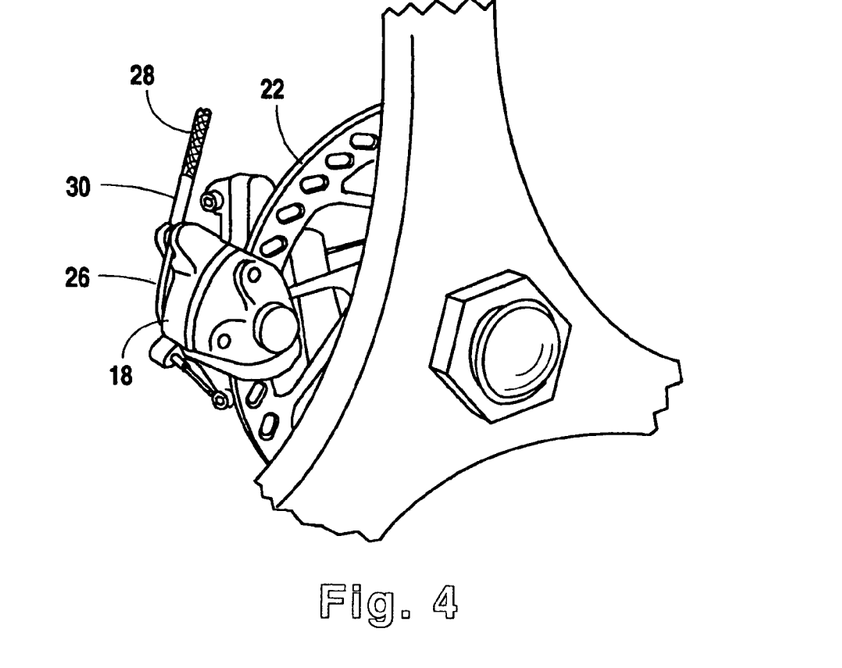
FIG. 4 is an enlarged perspective view depicting the caliper braking mechanism.

First and second caliper brakes 18 are mounted to extension plates (not shown) which are in turn mounted to the frame 14. The caliper brakes 18 are positioned to clamp onto first and second disks 22 (see FIGS. 1 and 4). In the preferred embodiment of this invention, the first and second caliper brakes 18 are manufactured by Hayes/HMX, model number BR3920. However, numerous other cable actuated caliper brakes are available on the market and can be used in this invention. The first and second wheelchair wheels 24 can be detached without removal of the first and second disks 22 or the first and second caliper brakes 18.

Figure 2A:
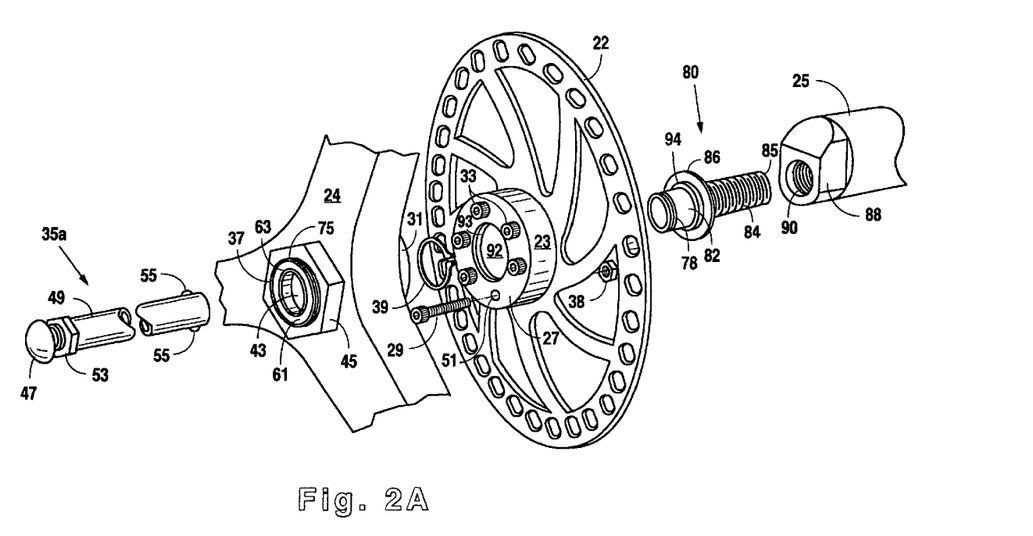
FIG. 2A is an enlarged exploded perspective view depicting the locking pin, wheelchair wheel, hub, disk, and axle assembly which has a spring biased push button type locking pin and first interlocking hub design.
Figure 2B:
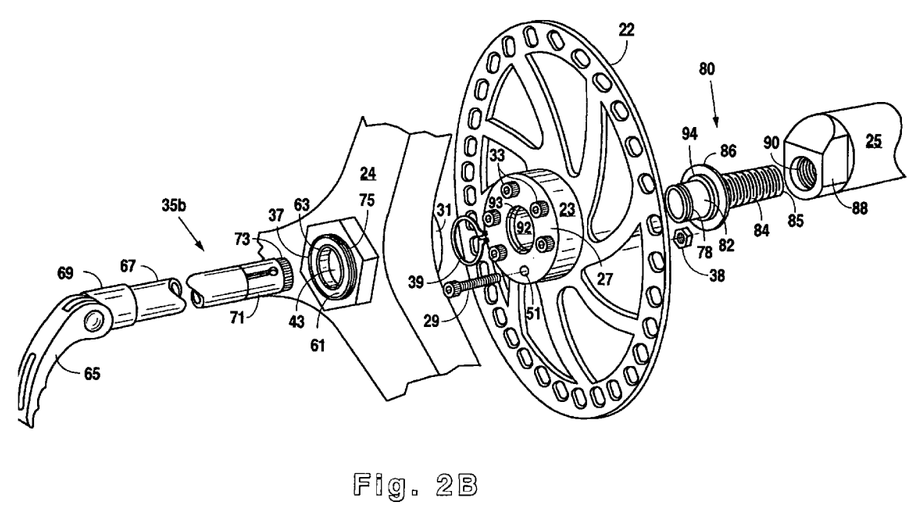
FIG. 2B is an enlarged exploded perspective view depicting the locking pin, wheelchair wheel, hub, disk, and axle assembly wherein the locking pin is equipped with a lever which activates an expandable tip.
Figure 2C:
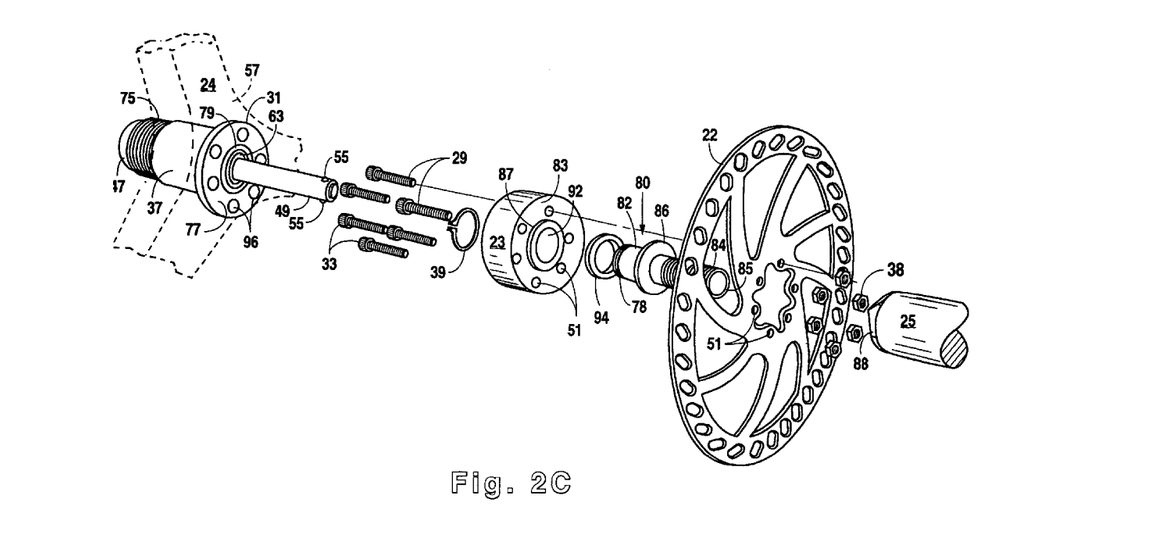
FIG. 2C is an enlarged exploded perspective view depicting FIG. 2A from the opposite angle.
Figure 2D:
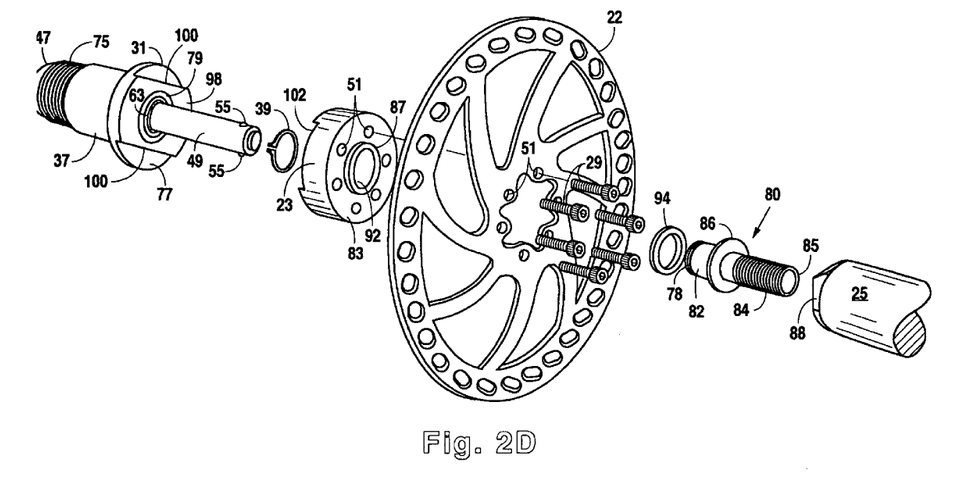
FIG. 2D is an enlarged exploded perspective view depicting the locking pin, wheelchair wheel, hub, disk, and axle assembly. This figure depicts a second interlocking hub design.
Figure 2E:
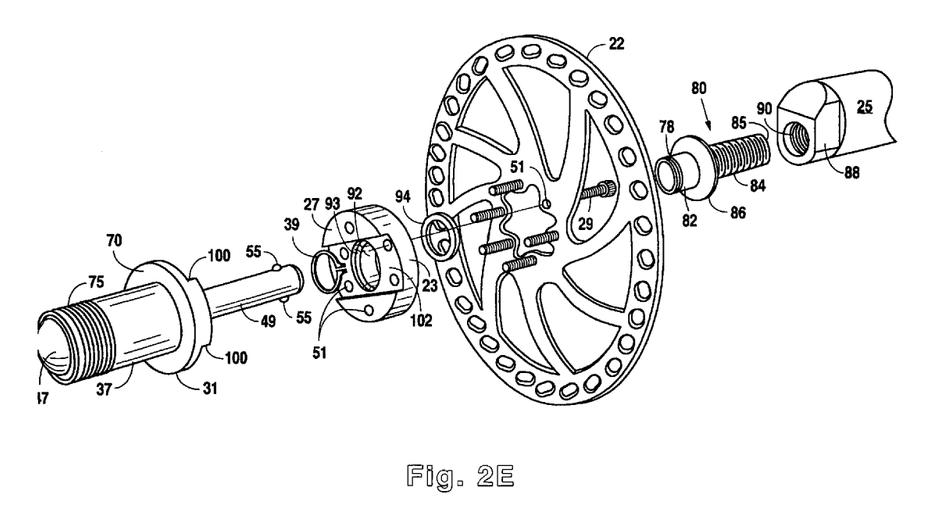
FIG. 2E is an enlarged exploded perspective view depicting FIG. 2D from the opposite angle.

Referring to FIGS. 2A through 2E, the first and second disks 22 are concentrically mounted to the inner face 83 first and second disk hubs 23 by means of a plurality of screws 29 passing through radially spaced interiorly threaded, aligned holes 51 in the first and second disk hubs 23 and the first and second disks 22. In the preferred embodiment, as shown in FIGS. 2A, 2B, and 2C, the screws 29 are Allen screws where the heads 33 of the screws 29 extend from the outer vertical faces 27 of the first and second disk hubs 23 and are secured on the opposite end by nuts 38. In a second preferred embodiment, as shown in FIGS. 2D and 2E, the screws 29 are of a length insufficient to extend beyond the outer vertical faces 27 of the first and second disk hubs 23.

The first and second disk hub 23 and disk 22 assemblies are concentrically mounted to outer ends of first and second detachable axle pieces 80 and rotate thereon. The first and second detachable axle pieces 80 are tubular with a smooth surface portion 82 at their outer end and a exteriorly threaded portion 84 at their inner end. The smooth surface portion 82 and the exteriorly threaded portion 84 are divided by a flange 86.

Figure 3:
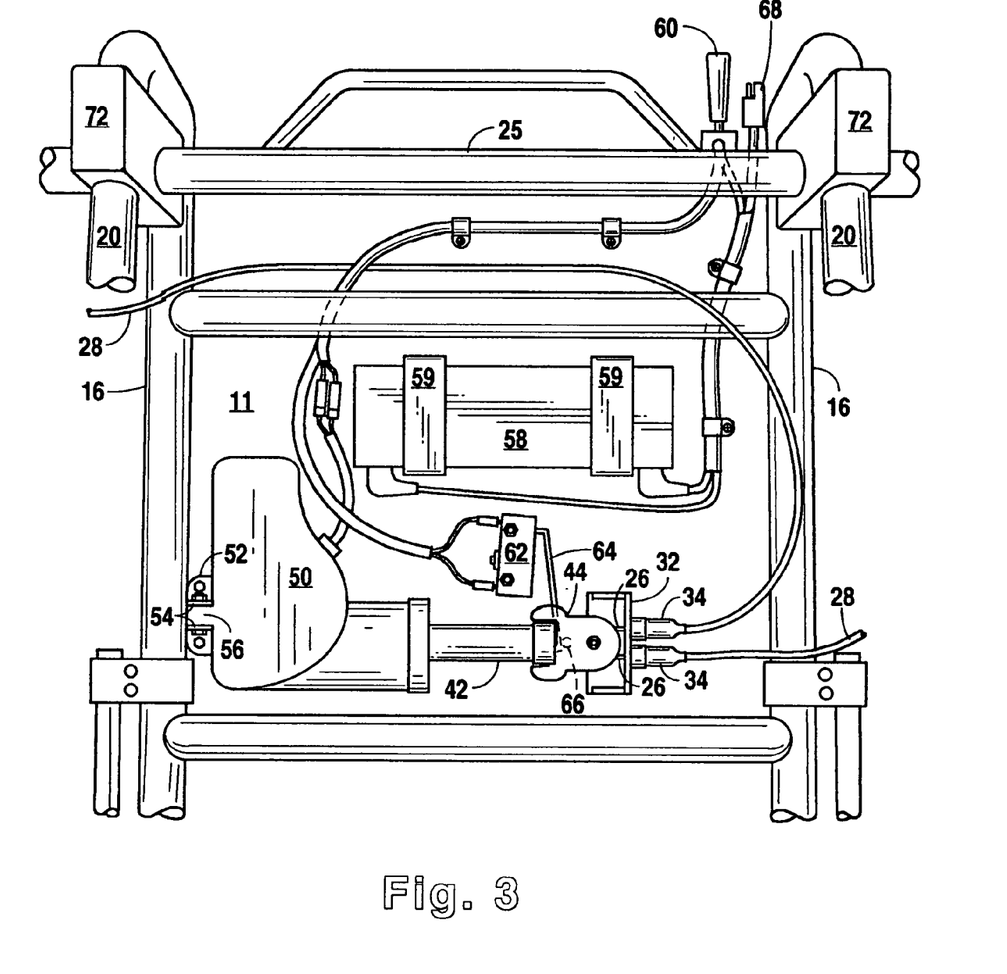
FIG. 3 is a bottom view of the wheelchair seat depicting the toggle switch, the battery recharging outlet, the electrical wiring, the twelve-volt rechargeable battery, the DC linear actuator, the cable wire and pulley assembly, and the motion limit switch.

The first and second detachable axle pieces 80 are mounted to the frame 14 of the wheelchair 10 (see FIG. 1) by screwing the exteriorly threaded portion 84 into a tubular axle 25. As shown in FIG. 3, the tubular axle 25 is clamped to the first and second lower curved components 20 of the frame 14 (See FIG. 1) at its rear extremity by first and second frame clamps 72.

Referring again to FIGS. 2A through 2E, the outer ends of the tubular axle 25 have mounting heads 88. Each mounting head 88 has a threaded bore 90 with a diameter sufficient to accept and secure the exteriorly threaded portion 84 of the first and second detachable axle pieces 80 therein. The first and second detachable axle pieces 80 are mounted to the tubular axle 25 by screwing the exteriorly threaded portion 84 into the threaded bore 90.

The first and second disk hub 23 and disk 22 assemblies are secured to the first and second detachable axle pieces 80 by means of a clip ring 39. The clip ring 39 is spring biased to close around and fit in to a circumferential groove 78 cut into the smooth surface portion 82 of the first and second detachable axle pieces 80 at their extreme outer end. In order to allow the first and second disk hub 23 and disk 22 assemblies to rotate on the first and second detachable axle pieces 80, the smooth surface portion 82 of the first and second detachable axle pieces 80 extend axially through a tubular opening 92 at the center of the first and second disk hubs 23 and the outer face of flange 86 abuts a concentric circular shoulder 87 (see FIGS. 2C and 2D) on the inner face 83 of the first and second disk hubs 23 with a spacer ring 94 between. The spacer ring 94 prevents frictional contact between the outer face of flange 86 and the circular shoulder 87 on the inner face of the first and second disk hubs 23. In the preferred embodiment, the spacer ring 94 is a Delrin washer. However it is anticipated that other smooth, durable material can be substituted.

Referring to FIGS. 2A, 2B, and 2E, the outer vertical face 27 of the first and second disk hub have a concentric circular recessed portion 93 surrounding the tubular opening 92. The horizontal length of the smooth surface portion 82 of the detachable axle piece 80 is sufficient to allow the smooth surface portion 82 to extend through the tubular opening 92 of the first and second disk hubs 23 and expose the circumferential groove 78 on the opposite side of the first and second disk hubs 23 with minimal clearance at the concentric circular recessed portion 93. This allows the clip ring 39 to close around circumferential groove 78 within the concentric circular recessed portion 93.

As shown in FIGS. 2A through 2C, the first and second wheelchair wheels 24 are concentrically mounted on the first and second wheel hubs 37. The inner surface 57 of the first and second wheelchair wheels 24 (See FIG. 2C) is mounted flush against the outer vertical surface 70 (See FIG. 2E) of the flanged inner portion 31 of the first and second wheel hubs 37 and are secured to the first and second wheel hubs 37 by first and second nuts 45, which screw onto exteriorly threaded outer ends 75 of the first and second wheel hubs 37. The first and second wheel hubs 37 have a tubular opening 43 through their center. As shown in FIGS. 2A and 2B, an outer circular bearing assembly 61 is pressed fit into the tubular opening 43 towards the outer end of the first and second wheel hubs 37.

As shown in FIGS. 2B, 2C, and 2D, an inner circular bearing assembly 79 is pressed fit into the tubular opening 43 at the inner end of the first and second wheel hubs 37. The outer bearing assembly 61 and inner bearing assembly 79 have inner rings 63 which turn within the bearing assemblies. The inner diameter of the inner rings 63 is equal to the inner diameter of first and second detachable axle pieces 80. In the preferred embodiment, the outer circular bearing assembly 61 and inner circular bearing assembly 79 are manufactured by NICE, Model No. 1616 DC TN or KYK, Model No. R-8-DDHA1(IB). However, it is anticipated that other similar bearings could be used.

Referring again to FIGS. 2A through 2E, when the first and second wheelchair wheels 24 are mounted to the wheel hub 37 and in turn mounted to the wheelchair 10 (See FIG. 1), the outer vertical faces 27 of the first and second disk hubs 23 interlock with inner faces 77 of the flanged inner portion 31 of the first and second wheel hubs 37. In the preferred embodiment, as shown in FIGS. 2A, 2B, and 2C, the inner faces 77 of the flanged inner portion 31 of the first and second wheel hubs 37 are flat with a plurality of radially spaced holes 96 shown in FIG. 2C. The heads 33 of the plurality of screws 29 fit snugly into the corresponding radially spaced circular holes 96 in the flanged inner portion 31 of the first and second wheel hubs 37. In an alternate embodiment, as shown in FIGS. 2D and 2E, the inner face 77 of the flanged inner portion 31 of the first and second wheel hubs 37 have a raised surface 98 extending from the inner face 77. The raised surface 98 is centered on the inner face 77 with parallel sides 100 extending to the circumference of the inner face 77. The parallel sides 100 extend perpendicularly from the inner face. In this alternate embodiment, the outer vertical faces 27 of the first and second disk hubs 23 have a channel 102. The placement and dimensions of the channel 102 are to allow the raised surface 98 to fit snugly into the channel 102 with minimal clearance at all contiguous surfaces when the first and second wheel hubs 37 are interlocked with the first and second disk hubs 23.

In the preferred embodiment, as shown in FIGS. 2A, 2B, and 2C, the interlocking of heads 33 within the radially spaced circular holes 96 cause the first and second wheelchair wheels 24 and the first and second disks 22 to rotate together. In another alternate embodiment, as shown in FIGS. 2D and 2E, the interlocking of the raised surface 98 on the inner face 77 of the first and second wheel hubs 37 with the channel 102 in the outer vertical faces 27 of the first and second disk hubs 23 cause the first and second wheelchair wheels 24 (See FIG. 1) and the fist and second disks 22 to rotate together.

Still referring to FIGS. 2A through 2E, in order to hold the first and second disk hubs and the first and second wheel hubs together when interlocked, first or second locking pins 35*a* and 35*b* (see FIGS. 2A and 2B) extend axially through the center of the first and second wheel hubs 37, the first and second disk hubs 23, and into the first and second detachable axle pieces 80. The first or second locking pins 35*a* and 35*b* have a diameter which allows the first or second locking pins 35*a* and 35*b* to slide through the inner rings 63 of the outer circular bearing assembly 61 (See FIGS. 2A and 2B) and the inner circular bearing assembly 79 (See FIGS. 2C and 2D) and into the first and second detachable axle pieces 80 with minimal clearance.

The first and second wheelchair wheels 24 can be detached from the wheelchair 10 (See FIG. 1) without removing the first and second disks 22 or disturbing the first and second caliper brakes 18 by removing the first and second locking pins 35*a* or 35*b* and separating the first and second wheel hubs 37 from the first and second disk hubs 23.

In the preferred embodiment of the invention (see FIGS. 2A, 2C, 2D, and 2E), the first and second locking pins 35*a* have a push button 47, a rod 49, an adjusting nut 53, and a set of retractable nipples 55. The push button 47 is spring biased in the released position, causing the retractable nipples 55 to extend from the rod 49. When the push button 47 is depressed, the retractable nipples 55 retract into the rod 49. The first and second locking pins 35*a* can be inserted through the inner ring 63 of the outer circular bearing assembly 61 and into the tubular openings 43 of the first and second wheel hubs 37 by depressing the push button 47 and thereby causing the retractable nipples 55 to retract. When the first and second locking pins 35*a* are further inserted through the first and second disk hubs 23 and into the first and second detachable axle pieces 80 and the push button 47 is released, the retractable nipples 55 extend into grooves (not shown) circumferentially cut into the tubular interior surface (not shown) of the first and second detachable axle piece 80. The grooves (not shown) are of sufficient depth and width to allow the retractable nipples 55 to extend into the grooves (not shown) with minimal clearance. The grooves (not shown) are positioned in the first and second detachable axle pieces 80 to allow the retractable nipples 55 to extend into the first and second grooves (not shown) when the first and second locking pins 35*a* are fully inserted into the first and second wheel hubs 37 such that the adjustable nut 53 contacts the outer surface of the outer circular bearing assembly 61. In the preferred embodiment, the first and second locking pins 35*a* are QRP Quick Release Push Button (large/small) Axle, Model No. 21QRP11CDASN.

In an alternate embodiment of the invention, the length of the exteriorly threaded portion 84 of the first and second detachable axle pieces 80 is sufficient to allow the position of the retractable nipples 55 on the first and second locking pins 35*a* to extend beyond the inner lip 85 of the first and second detachable axle pieces 80 when the first and second locking pins 35*a* are fully inserted into the first and second wheel hubs 37 such that the adjustable nut 53 contacts the outer surface of the outer circular bearing assembly 61. Thus, when the first and second locking pins 35*a* are fully inserted and the push button 47 is released, the retractable nipples 55 extend adjacent to the inner lip 85 of the first and second detachable axle pieces 80 with minimal clearance and thereby holding the first and second locking pins 35*a* in place. In this embodiment, the first and second locking pins 35*a* are, once again, QRP, Quick Release Push Button (large/small), Axle Model No. 21QRP11CDASN.

In yet another embodiment of the invention (see FIG. 2B), the first and second locking pins 35*b* have a release lever 65 at one end of a rod 67, a spacer joint 69 between the release lever 65 and the rod 67, an expandable tip 71 attached to the other end of the rod 67, and a wedging cap 73 attached to the expandable tip 71 opposite the rod 67. When the release lever 65 is rotated to the released position so that it extends parallel with the rod 67, the diameter of the expandable tip 71 is not expanded and is equal to the diameter of the rod 67. When the release lever 65 is rotated perpendicular to the rod 67, the wedging cap 73 is pulled toward the release lever 65 causing the expandable tip 71 to expand to a diameter greater than the diameter of the rod 67. When the release lever 65 is in the released position, the first and second locking pins 35*b* can be inserted through the inner ring 63 of the outer circular bearing assembly 61 and into the tubular opening 43 of the first and second wheel hubs 37. When the first and second locking pins 35*b* are inserted through the first and second wheel hubs 37, and into the first and second detachable axle pieces 80 and the release lever 65 is then rotated perpendicular to the rod 67, the expandable tip 71 expands into and makes frictional contact with the interior surface (not shown) of the first and second detachable axle pieces 80. The frictional force created is great enough to hold the first and second locking pins 35*b* in place. The diameter of the spacer joint 69 is greater than the inner diameter of the inner ring 63 of the outer circular bearing assembly 61, such that when the first and second locking pins 35*b* are fully inserted, the spacer joint 69 contacts the outer face of the outer circular bearing assembly 61. In this preferred embodiment, the locking pin 35*b* is the Ultra Axle, 0.50" O.D. manufactured by Rousson Chamoux.

The first and second caliper brakes 18 are activated by pulling a cable wire 26 (See FIGS. 4 and 5) attached to the caliper brakes 18 at first and second ends of the cable wire 26. The first and second ends of the cable wire 26 are directed to the first and second caliper brakes 18 through a cable wire housing 28 which is attached to a nozzle 30 on the first and second caliper brakes 18. The first and second ends of the cable wire 26 are attached to the first and second caliper brakes 18, respectively, in typical fashion. The cable wire 26 passes through the nozzle 30 of the first and second caliper brakes 18 and into the cable wire housing 28. The cable wire housing 28 directs the cable wire 26 to a mounting bracket 32 (See FIG. 5). The mounting bracket 32 has a vertical portion, and an upper horizontal portion. The mounting bracket 32 is mounted to the bottom of the solid seat base 11 by two screws (not shown) passing through interiorly threaded aligned holes in the solid seat base 11 and upper horizontal portion of the mounting bracket 32.

Figure 5:
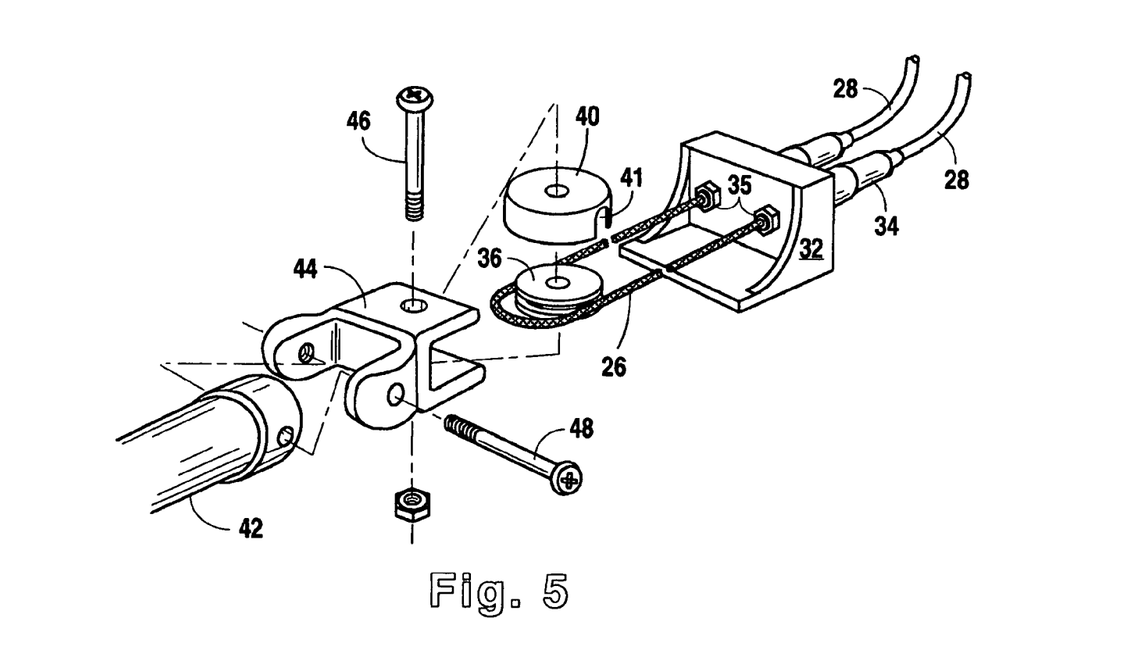
FIG. 5 is an exploded perspective view depicting the cable wire and pulley assembly and actuator rod mount.

The cable wire housing 28 is connected to the mounting bracket 32 by means of first and second hollow connectors 34. The first ends of the first and second hollow connectors 34 fit snugly within first and second circular openings (not shown) in the mounting bracket 32 and the second ends of the first and second hollow connectors 34 fit snugly around the cable wire housing 28. The centers of said first and second circular openings (not shown) are equidistant from the upper horizontal portion of the mounting bracket 32 and are horizontally spaced a distance equal to the diameter of the pulley 36. The diameter of the first and second circular openings (not shown) is sufficient to allow the first and second hollow connectors 34 to fit snugly and the cable wire 26 to pass through first and second circular openings (not shown) within the first and second hollow connectors 34. The cable wire 26 passes through the circular openings in the mounting bracket 32 within the first and second hollow connectors 34 and then passes around the pulley 36.

The pulley 36 and cable wire 26 assembly is covered with a circular pulley cap 40. The inner diameter of the circular pulley cap 40 is of sufficient dimension to cover the pulley 36 and wire cable 26 assembly with minimal clearance. The vertical side of the pulley cap 40 has first and second openings 41 spaced to allow the cable wire 26 to pass into the pulley cap 40 and around the pulley 36. In the preferred embodiment of this invention, the segments of the cable wire 26 on opposite sides of the pulley 36 between the pulley 36 and mounting bracket 32 are parallel. Both segments of the cable wire 26 are perpendicular to the vertical side of the mounting bracket 32.

The pulley cap 40, pulley 36, and wire cable 26 are connected to an actuator rod 42 of a DC linear actuator 50 (See FIG. 3) by means of a coupling bracket 44. The pulley cap 40, pulley 36, and wire cable 26 are connected to the coupling bracket 44 by a bolt and nut combination 46 passing through holes vertically aligned with the axis of the pulley cap 40 and pulley 36. The actuator rod 42 is connected to the coupling bracket 44 by a bolt and nut combination 48 passing through holes horizontally aligned through the coupling bracket 44 and through the center of the outer end of the actuator rod 42.

The DC linear actuator 50, as shown in FIG. 3, is mounted to the solid seat base 11 by means of a mounting flange 56 and an actuator mounting piece 52. The actuator mounting piece 52 is mounted to the solid seat base 11 by two nut and bolt combinations. The mounting flange 56 is mounted to the actuator mounting piece 52 by a nut and bolt combination passing through horizontally aligned holes in the mounting flange 56 and first and second vertical portions 54 of the actuator mounting piece 52. The DC linear actuator is positioned so that displacement of the actuator rod 42 is in a direction perpendicular to the vertical portion of the mounting bracket 32 and centered between the first and second circular openings (not shown) in the vertical portion of the mounting bracket 32. In the preferred embodiment, the DC linear actuator 50 is manufactured by Warner Electric, model number DE12Q17W41-02FHM3HN.

The DC linear actuator 50 is powered by a twelve-volt rechargeable battery 58 mounted to the bottom of the solid seat base 11. In the preferred embodiment of this invention, the twelve volt rechargeable battery 58 is mounted to the solid seat base 11 by first and second Velcro straps 59. Each of the first and second Velcro straps 59 pass through two slits (not shown) in the solid seat base 11 such that each of the first and second Velcro straps 59 pass through the first slit (not shown) to the top of the solid seat base 11 and back through the second slit (not shown) and around the twelve volt rechargeable battery 58. In the preferred embodiment of this invention, the twelve volt rechargeable battery 58 is a sealed, non-spillable, lead battery manufactured by CSB Battery Company, Ltd.

A recharger outlet 68 is mounted to the frame 14 and is wired across the positive and negative leads of the twelve volt rechargeable battery 58. In the preferred embodiment of this invention, the recharger outlet 68 is mounted to the rear of the solid seat base 11. However, the recharger outlet 68 can be mounted generally to any part of the frame 14 where it is convenient and accessible.

Figure 6:
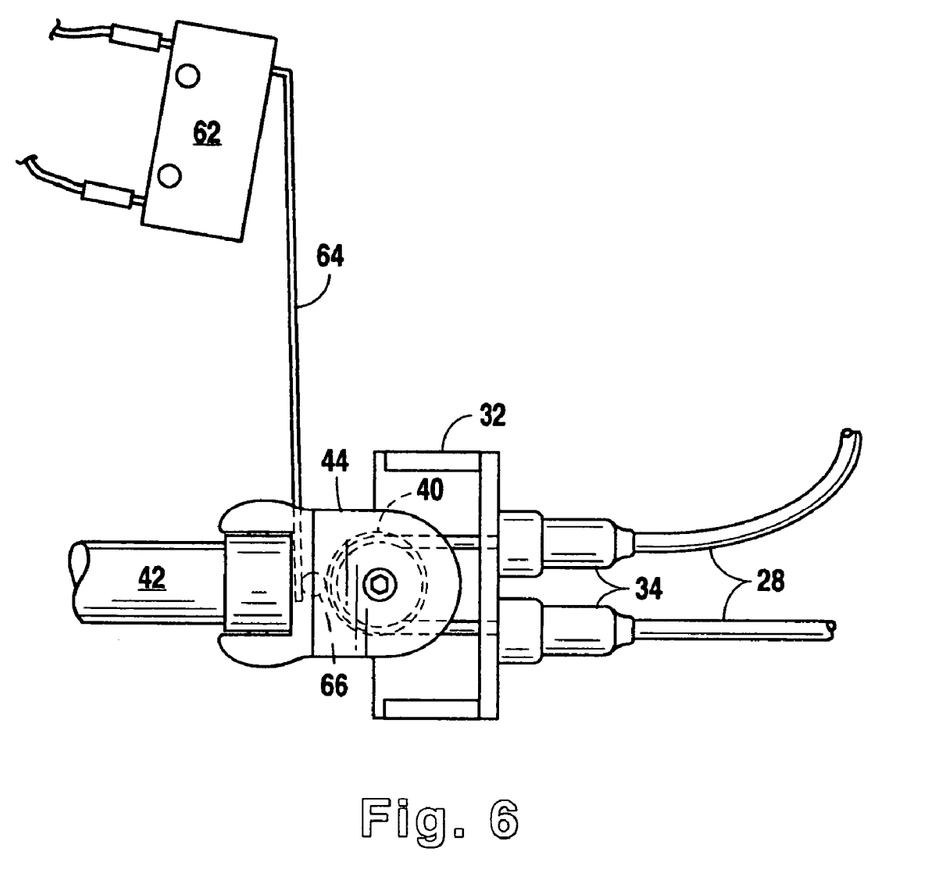
FIG. 6 is a bottom view of the cable wire, pulley, and actuator rod assembly brackets and the motion limit switch.
Figure 7:
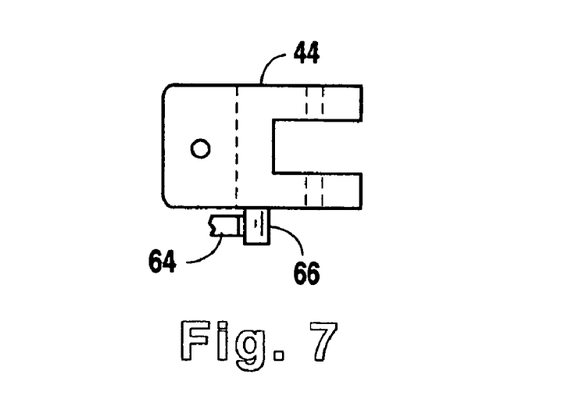
FIG. 7 is a elevational side view of the coupling bracket.
Figure 8:
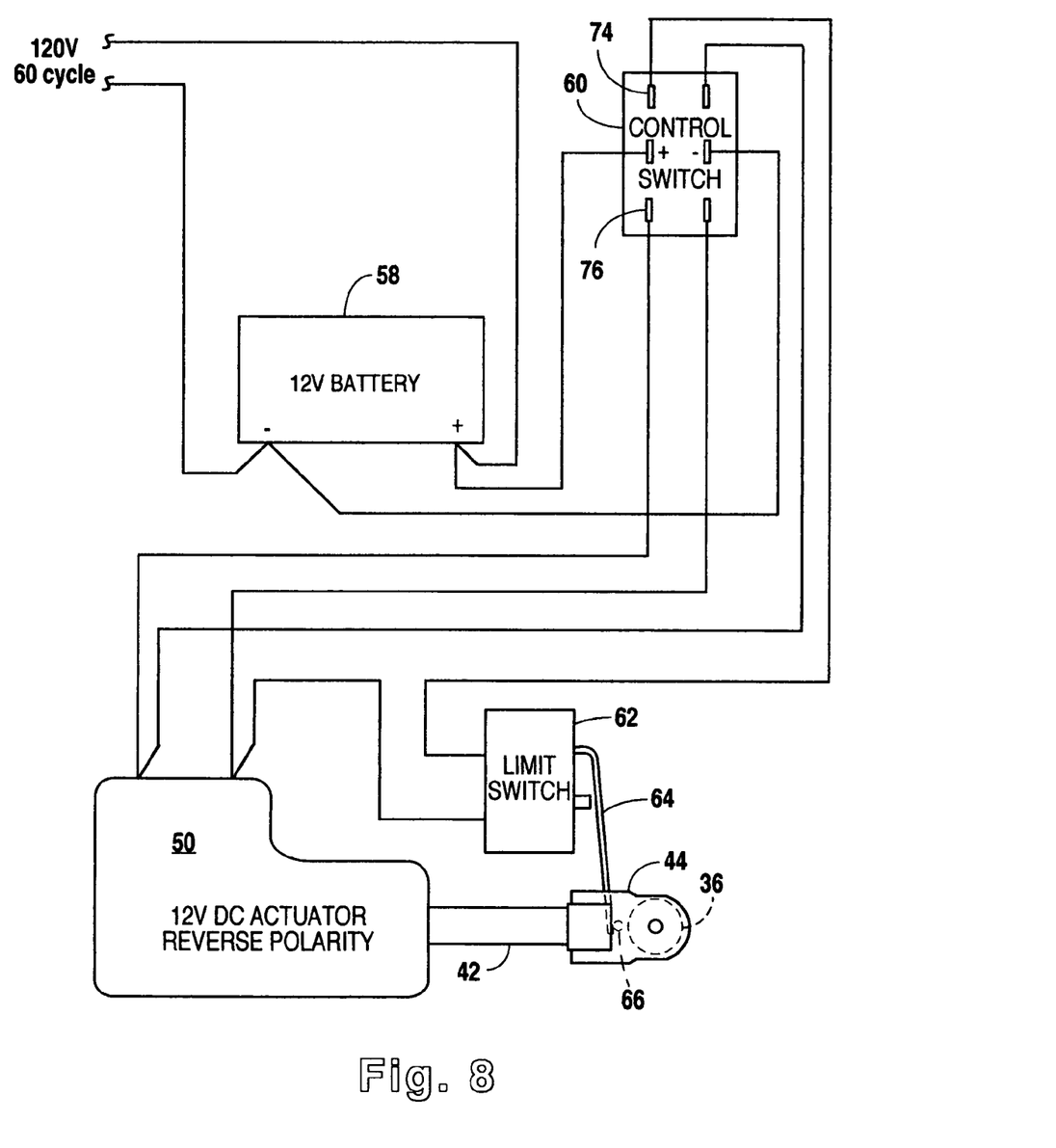
FIG. 8 is an electrical circuit diagram illustrating the electrical control circuit of this invention.

As shown in FIGS. 3 and 8, the battery power is controlled by a double throw toggle switch 60 which is mounted to the frame 14. In the preferred embodiment of this invention, the double throw toggle switch 60 is mounted to vertical component 15 of the frame 14. (See FIG. 1.) However, the double throw toggle switch 60 can be mounted generally to any part of the frame 14 where it is convenient and accessible to the wheelchair user. The double throw toggle switch 60 is wired into the electrical circuit, as shown in FIG. 7, across the positive and negative leads of the twelve volt rechargeable battery 58. The double throw toggle switch 60 can be thrown in a first direction 74 or a second direction 76. If the double throw toggle switch 60 is thrown in the first direction 74, it closes the circuit and powers the motion of DC linear actuator 50 and causes the actuator rod 42 to retract. The retraction of the actuator rod 42 pulls the pulley 36 and cable wire 26 assembly causing the displacement of the cable wire 26 within the cable wire housing 28 in a direction away from the first and second caliper brakes 18 (See FIGS. 4, 5, and 6 in combination). The displacement of the cable wire 26 away from the first and second caliper brakes 18 causes equal tension in the cable wire 26 on opposite sides of the pulley 36 and activates the first and second caliper brakes 18 with equal braking force.

If the double throw toggle switch 60 is thrown in the second direction 76, it closes the circuit and the polarity and direction of current flow through the DC linear actuator 50 is reversed. This powers the motor of the DC linear actuator 50 in the reverse direction and causes the actuator rod 42 to extend. The extension of the actuator rod 42 displaces the pulley 36 and causes the cable wire 26 to move within the cable wire housing 28 toward the first and second caliper brakes 18. This in turn releases the tension in the cable wire 26 created by retracting the activator rod and deactivates the first and second caliper brakes 18. The first and second caliper brakes 18 are spring biased (not shown) toward the deactivated position which retains tension in the cable wire 26 while the actuator rod 42 is extending and prevents bunching of the cable wire 26.

In order to control the tension in the cable wire 26 when the actuator rod 42 is retracting, a motion limit switch 62 is placed in the electrical circuit, as shown in FIG. 7, between the positive lead of double throw toggle switch 60. When the double throw toggle switch 60 is thrown in the first direction 74, the motion limit switch 62 limits movement of the DC linear actuator 50. The motion limit switch 62 is equipped with a motion arm 64 as shown in FIGS. 3, 6, 7, and 8. The motion arm 64 is spring biased to contact and press against an actuating pin 66 as shown in FIGS. 3, 6, 7, and 8. The actuating pin 66 extends from, and is a part of, the coupling bracket 44 as more clearly illustrated in FIG. 6. The motion limit switch 62 is normally closed. Retraction of the actuator rod 42 causes displacement of the coupling bracket 44 and actuating pin 66, which in turn displaces the motion arm 64. Sufficient displacement of the motion arm 64 throws the motion limit switch 62 opening the circuit and preventing further retraction of the actuator rod 42. The displacement of the motion arm 64 required to throw the motion limit switch 62 is adjustable to allow for control and selection of the tension in the cable wire 26 and the resulting braking force.

In the normal operation of the wheelchair 10, it is desirable to have brakes activated during the transfer in and out of the wheelchair 10. If the wheelchair user intends to transfer out of the wheelchair, he will throw the toggle switch 60 in the first direction 74 which causes the actuator rod 42 to retract and activates the first and second caliper brakes 18. The wheelchair user should hold the toggle switch 60 in the first direction 74, thereby increasing the braking force applied by the first and second caliper brakes 18 until the motion limit switch 62 is thrown and opens the circuit which stops the retraction of the actuator rod 42. The user should then release the toggle switch 60 which is spring biased to the center, OFF position. The motor of the DC linear actuator 50 locks the actuator rod 42 in position when there is no power to the DC linear actuator 50. Thus, the first and second caliper brakes 18 will remain activated and hold the wheelchair 10 in position while the wheelchair user transfers out of the chair. The first and second caliper brakes 18 will remain activated until the toggle switch 60 is thrown and held in the second direction 76 and thereby allowing the actuator rod 42 to extend a sufficient amount to deactivate the first and second caliper brakes 18 and allow the first and second wheelchair wheels 24 to rotate freely. The toggle switch 60 is then released allowing it to spring back to the center OFF position which opens the circuit and stops the flow of power to the DC linear actuator 50.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A quick release, detachable wheel hub assembly for rotating a wheel thereon, said wheel hub assembly comprising:
    a detachable axle attachable to a frame;
    an interior hub rotatably mounted on said detachable axle;
    an exterior hub detachably interlockable with said interior hub and rotatable therewith, said wheel being mountable on said exterior hub for rotation therewith;
    a pin insertable in said exterior hub, said interior hub, and said detachable axle, said pin having a retractable member locking said pin within said exterior hub, said interior hub, and said detachable axle for holding said wheel hub assembly together, and said exterior hub rotating directly on said pin also being quickly releasable to disassemble said wheel hub assembly.

2. The quick release, detachable wheel hub assembly as recited in claim 1 wherein said detachable axle is tubular and further comprises:
    an inner portion with an exteriorly threaded surface screwably attachable to said frame;
    an outer portion adjacent said inner portion with a smooth exterior surface for mounting of and rotation thereon of said interior hub; and
    a flanged portion between said inner portion and said outer portion for shouldering said interior hub when mounted on said detachable axle.

3. The quick release, detachable wheel hub assembly as recited in claim 2 wherein said interior hub has at least one projection interlockable with at least one recess in said exterior hub.

4. The quick release, detachable wheel hub assembly as recited in claim 2 wherein said exterior hub has at least one projection interlockable with at least one recess in said interior hub.

5. The quick release, detachable wheel hub assembly as recited in claim 3 or 4 wherein said frame is a wheelchair frame.

6. A quick release, detachable wheel hub assembly for rotating a wheel thereon, said wheel hub assembly comprising:
    a detachable axle attachable to a frame;
    an interior hub rotatably mounted on said detachable axle;
    an exterior hub detachably interlockable with said interior hub and rotatable therewith, said wheel being mountable on said exterior hub for rotation therewith;
    a pin insertable in said exterior hub, said interior hub, and said detachable axle, said pin having an expandable member locking said pin within said exterior hub, said interior hub, and said detachable axle for holding said wheel hub assembly together, and said exterior hub rotating directly on said pin also being quickly releasable to disassemble said wheel hub assembly.

7. The quick release, detachable wheel hub assembly as recited in claim 6 wherein said detachable axle is tubular and further comprises:
    an inner portion with an exteriorly threaded surface screwably attachable to said frame;
    an outer portion adjacent said inner portion with a smooth exterior surface for mounting of and rotation thereon of said interior hub; and
    a flanged portion between said inner portion and said outer portion for shouldering said interior hub when mounted on said detachable axle.

8. The quick release, detachable wheel hub assembly as recited in claim 7 wherein said interior hub has at least one projection interlockable with at least one recess in said exterior hub.

9. The quick release, detachable wheel hub assembly as recited in claim 7 wherein said exterior hub has at least one projection interlockable with at least one recess in said interior hub.

10. The quick release, detachable wheel hub assembly as recited in claim 8 or 9 wherein said frame is a wheelchair frame.

* * * * *